United States Patent
Shynn et al.

(10) Patent No.: US 9,776,494 B2
(45) Date of Patent: Oct. 3, 2017

(54) MOTOR VEHICLE FRAME WITH CANTILEVERED ENGINE MOUNT BRACKET

(71) Applicant: FORD GLOBAL TECHNOLOGIES, LLC, Dearborn, MI (US)

(72) Inventors: Matthew David George Shynn, Earls Colne (GB); Bradley Staines, Bishops Stortford (GB); Joerg Reim, Cologne (DE); Matthew Sykes, Wickford (GB); Jon Horseman, Braintree (GB); Peter Brook, South Woodham Ferrers (GB); Alan Thorpe, Harlow Essex (GB); Raise Ahmed, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/167,007

(22) Filed: May 27, 2016

(65) Prior Publication Data
US 2016/0347162 A1     Dec. 1, 2016

(30) Foreign Application Priority Data
May 29, 2015     (GB) .................................. 1509254.7

(51) Int. Cl.
*B60K 5/12*     (2006.01)
*B60R 19/24*     (2006.01)
(Continued)

(52) U.S. Cl.
CPC ................ *B60K 5/12* (2013.01); *B60R 19/24* (2013.01); *B62D 21/02* (2013.01); *B62D 21/09* (2013.01); *B62D 25/08* (2013.01)

(58) Field of Classification Search
CPC ........... B60K 5/12; B62D 21/02; B62D 21/09
See application file for complete search history.

(56) References Cited

U.S. PATENT DOCUMENTS

| | | | | |
|---|---|---|---|---|
| 1,422,622 A | * | 7/1922 | Riddle | B60K 5/12 180/291 |
| 5,193,643 A | * | 3/1993 | McIntyre | B60G 99/00 180/312 |

(Continued)

FOREIGN PATENT DOCUMENTS

EP     1834862 A1     9/2007

OTHER PUBLICATIONS

Intellectual Property Office, Search Report for corresponding Great Britain Patent Application No. GB1509254.7, dated Nov. 30, 2015.

*Primary Examiner* — Brian Swenson
(74) *Attorney, Agent, or Firm* — Frank MacKenzie; Brooks Kushman P.C.

(57) ABSTRACT

A motor vehicle body structure includes a frame rail and a bracket attached to the rail and adapted for attaching an engine mount. The bracket has a first portion secured to the frame rail beneath the engine mount and at least one cantilever portion projecting at one end beyond the first portion. The cantilever portion defines an anchoring point for attachment of the engine mount that is spaced from the frame rail so that the portion of the frame rail beneath the anchoring point may undergo controlled deformation in the event of a front end vehicle collision.

16 Claims, 3 Drawing Sheets

(51) Int. Cl.
    *B62D 21/02*     (2006.01)
    *B62D 21/09*     (2006.01)
    *B62D 25/08*     (2006.01)

(56) References Cited

U.S. PATENT DOCUMENTS

| | | | |
|---|---|---|---|
| 5,466,033 A * | 11/1995 | Murakami | B62D 21/09 296/187.09 |
| 5,716,154 A * | 2/1998 | Miller | B60R 11/00 403/22 |
| 6,223,850 B1 * | 5/2001 | Rajca | B60K 5/12 180/312 |
| 6,431,602 B1 * | 8/2002 | Ralko | B60K 5/12 280/781 |
| 2012/0313360 A1 | 12/2012 | Akaki et al. | |
| 2014/0319880 A1 * | 10/2014 | Shigihara | B62D 25/08 296/193.09 |
| 2016/0107702 A1 * | 4/2016 | Stein | B62D 21/09 280/781 |
| 2017/0001509 A1 * | 1/2017 | Hlubina | B60K 5/12 |

* cited by examiner

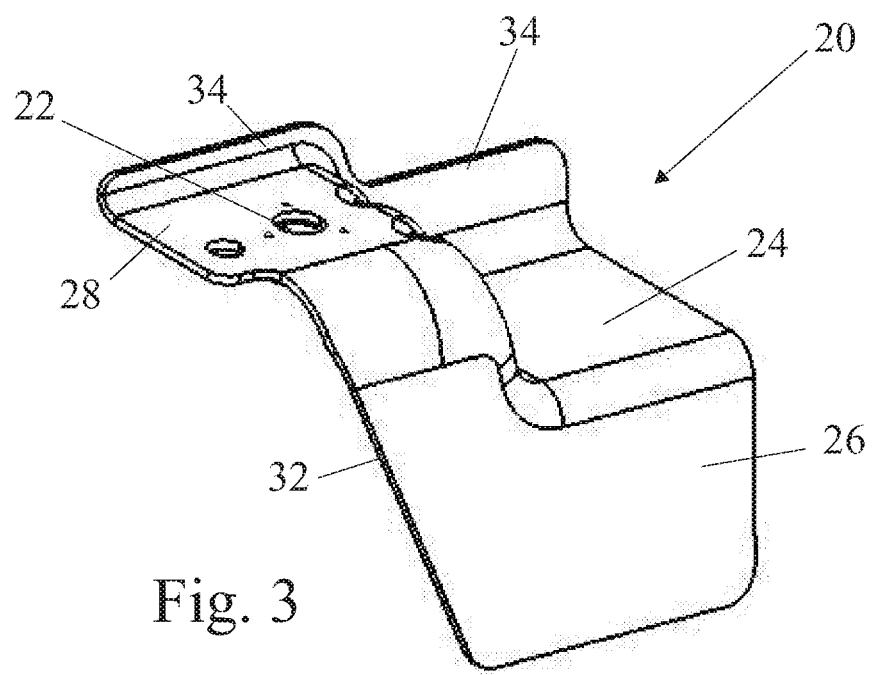
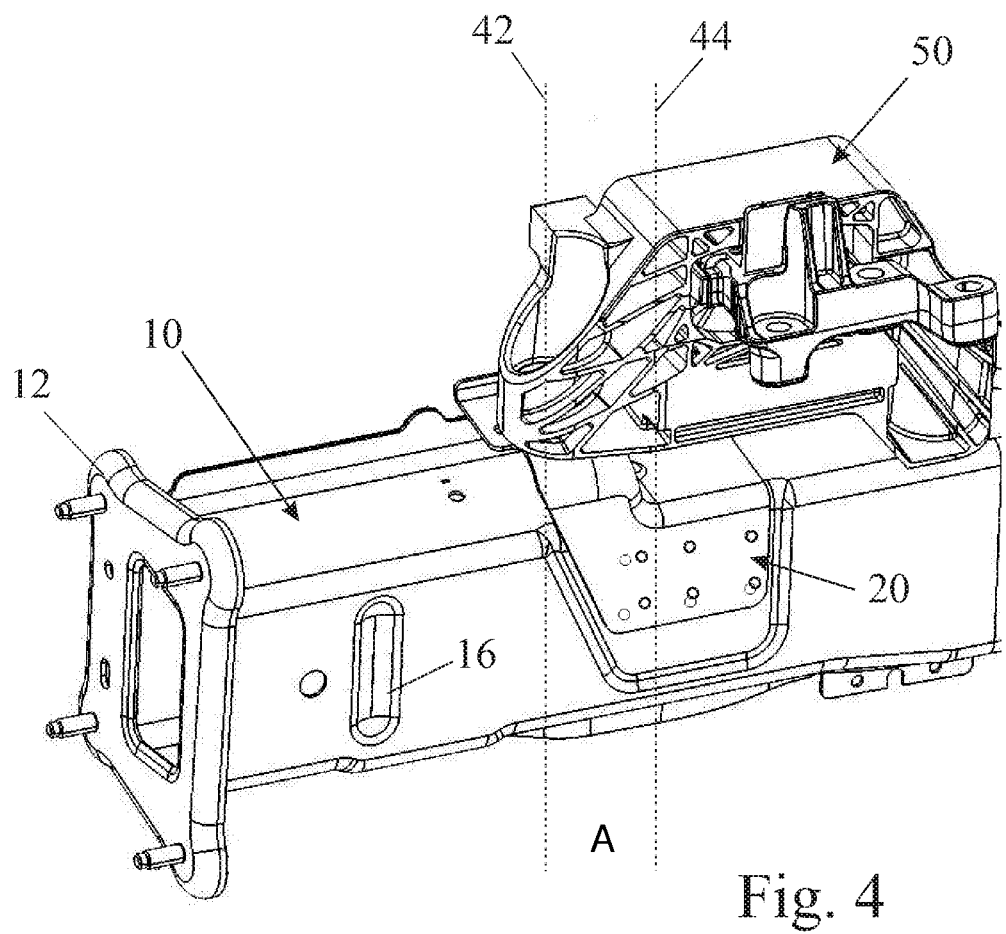

MOTOR VEHICLE FRAME WITH CANTILEVERED ENGINE MOUNT BRACKET

CROSS-REFERENCE TO RELATED APPLICATIONS

This application claims foreign priority benefits under 35 U.S.C. §119(a)-(d) to GB 1509254.7 filed May 29, 2015, which is hereby incorporated by reference in its entirety.

TECHNICAL FIELD

The invention relates to a frame structure for a motor vehicle, and more specifically to such a frame structure having a bracket with a cantilevered portion for attaching an engine mount.

BACKGROUND

In a motor vehicle with a front mounted engine, it is known to secure the engine to the vehicle body in the engine compartment using mounts that allow some relative movement between the engine and the body. Though the term "engine mount" is used herein, in some vehicle configurations, the mount supports the entire drive train, as the engine, transmission and differential may be formed as one unit. Each mount has a rigid main body that is secured to the body of the vehicle and a fixing point from which the engine is suspended that is connected to the main body by bushings, and sometimes fluid filled shock absorbers, that serve to isolate the body from engine noise and vibrations.

The engine mounts generally are secured to two frame rails (usually extending in the longitudinal direction), or to a sub-frame of the vehicle, and are positioned one on each side of the engine compartment. Apart from supporting the power train, the frame rails form part of the monocoque frame that ensures the structural rigidity of the vehicle body and longitudinal frame rails usually are intentionally designed to crumple in the event of a front end collision, in order to absorb the energy of the impact.

The front bumper of the vehicle is mounted on the front ends of the rails and is itself intended to absorb the energy of a minor impact (below, say, 10 kph) without the frame rails incurring any damage. In the event of a more serious impact the front ends of the frame rails crumple, but only as far as the point to which the engine mount is secured. This is because the rigid main body of the engine mount strengthens the frame rail and prevents it from being crushed. In this way, even for moderate impacts (below, say, 30 kph), the engine is not pushed towards the passenger compartment. At still higher impact speeds, the section of the frame rail behind the engine mounts deforms to absorb still more energy.

The main body of the engine mount is secured to the frame rail by fixing bolts at the front and rear of the engine mount. The section of the frame rails between the fixing bolts of the engine mount cannot be used to the same extent in absorbing the energy of a collision. It would therefore be desirable to minimize the distance between the fixing bolts of the mount but this distance is dictated by other factors, amongst them the size of the bushings needed to provide the desired absorption and the size of the fluid filled hydraulic damper.

SUMMARY

The disclosed motor vehicle body structure maximizes the length of the frame rail that can be crushed in the event of a collision while at the same time providing anchoring points for the engine mount that are sufficiently spaced apart.

In accordance with a first aspect of disclosed apparatus, motor vehicle body structure comprises an engine mount, a frame rail and a bracket disposed between the engine mount and the frame rail, wherein the bracket has a first portion secured to the rail beneath the engine mount and at least one cantilever portion projecting at one end beyond the first portion, the cantilever portion defining an anchoring point for attachment of the engine mount that is spaced from the frame rail.

Because in the disclosed arrangement the engine mount is secured to an anchoring point that is itself spaced from the frame rail, the part of the frame rail that is overhung by the cantilever portion of the bracket is not stiffened by the engine mount and can therefore take part in absorbing the energy of a front end collision.

In one disclosed embodiment, the first portion of the bracket is constructed as a saddle having a top plate resting on a top surface of the frame rail and a side plate resting against a lateral surface of the frame rail. At least one of the top plate and the side plate may be welded to the frame rail.

The cantilever portion has a first section that overhangs and is generally parallel to, but space from, the top plate of the first portion and includes an anchoring point for the engine mount. The overhanging first section is connected by an inclined second section to the top plate of the first portion, in contact with the top surface of the frame rail.

To strengthen the bracket, the overhanging portion may include a side gusset connected to both sections of the cantilever portion of the bracket and contiguous with the side plate of the first portion of the bracket.

The opposite lateral edges of the top plate of the first portion and of the first and second sections of the overhanging portion of the bracket may be turned upwards, that is to say away from the frame rail, to form a short flange that lies in a plane parallel to that of the side plate and the gusset.

In disclosed embodiments, the bracket may be formed of pressed sheet metal, such as mild steel, that is secured to the frame rail and protected against corrosion at the same time as the remainder of the frame rail.

In an alternative embodiment, the bracket is formed of a sold casting, such as of aluminum, that is bolted to the frame rail and having cantilever portions at both ends for receiving fixing bolts of the engine mount. In this case, the bracket may be bolted to the frame rails using bolts that are closer to one another than the bolts securing the engine mount to the bracket.

In accordance with a second disclosed embodiment, there is provided a bracket for connecting an engine mount to a frame rail of a vehicle, the bracket having a first portion to be secured to the frame rail beneath the engine mount and at least one cantilever portion extending at one end beyond the first portion, to lie at a distance from the frame rail when the bracket is secured to the frame rail, the cantilever portion defining an anchoring point for attachment of the engine mount at a position along the length of the frame rail that remains deformable by the impact of a front end vehicle collision.

The invention will now be described further, by way of example, with reference to the accompanying drawings, in which:

BRIEF DESCRIPTION OF THE DRAWINGS

FIG. 3 shows the inboard side of the bracket of FIGS. 1 and 2 on its own as viewed from the front and drawn to an enlarged scale, FIG. 4 is a view similar to that of FIG. 1 but additionally showing an engine mount fixed to the frame rail and the bracket.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
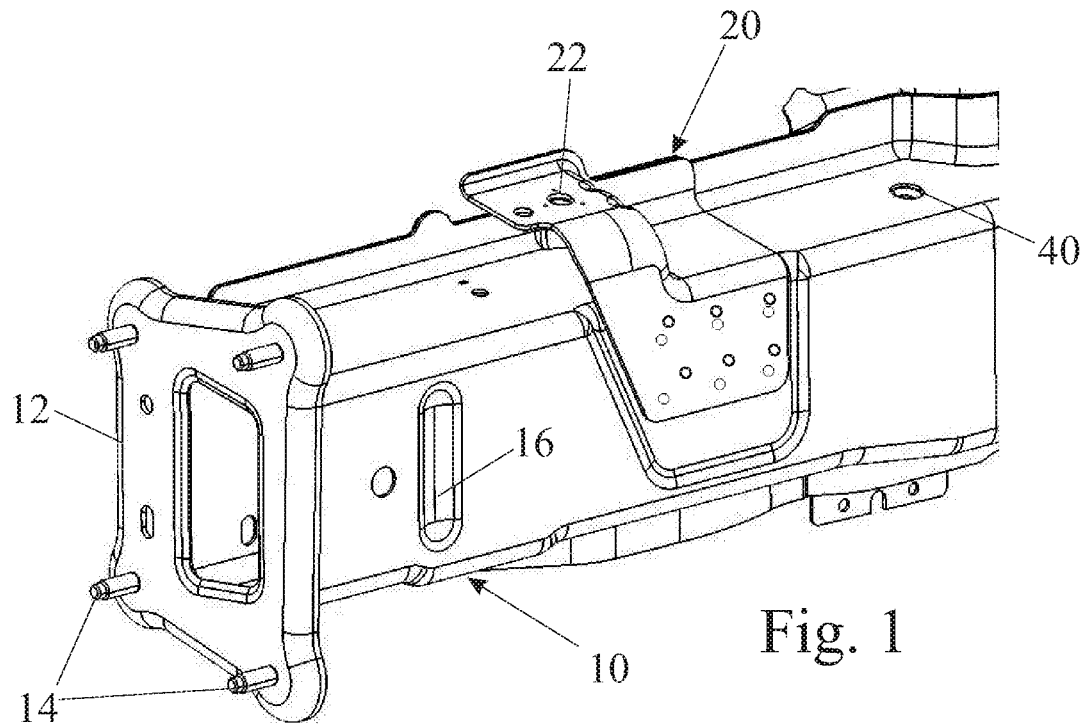
FIG. 1 is a perspective view from the front of a portion of a motor vehicle body structure, specifically the inboard side a vehicle frame rail fitted with a bracket that provides one of two anchoring points for an engine mount.
Figure 2:
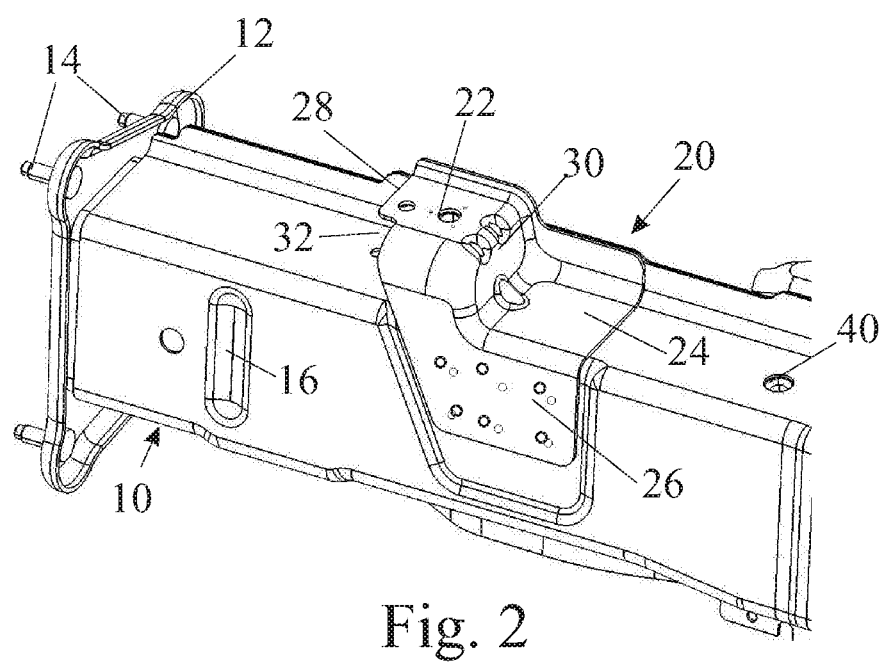
FIG. 2 is a perspective view from the rear of the inboard side of the frame rail and bracket shown in FIG. 1.

FIGS. 1 and 2 show a portion of a motor vehicle body structure, specifically the inboard side of the front end of the right frame rail 10 of a vehicle as seen from the front and the rear of the vehicle, respectively. As used herein, the terms "front" and "rear" are referenced to the vehicle body as a whole. The terms "left" and "right" refer the sides of the vehicle as viewed from its rear and the terms "inboard" and "outboard" refer to sides that face, respectively, inwards (towards the engine or passenger compartment) and outwards.

At its front end, the frame rail has a mounting plate 12 with projecting studs 14 to receive the front bumper of the vehicle. The bumper, which is not shown, is itself capable of deforming to absorb some of the impact of a front end collision but is only capable of protecting the remainder the vehicle from damage at relatively low impact speeds.

At higher impact speeds, the frame rail 10 is designed to deform to absorb the impact energy in order to reduce the impact energy that reaches as far as the passenger compartment. To achieve this, the frame rail is shaped so that it will crumple in a controlled manner. As an example of the steps taken to assure controlled deformation of the frame rail 10 in the event of an impact, an indentation 16 is provided on the inboard side of the frame rail 10 to create a weak point that acts as an initiator.

Figure 5:
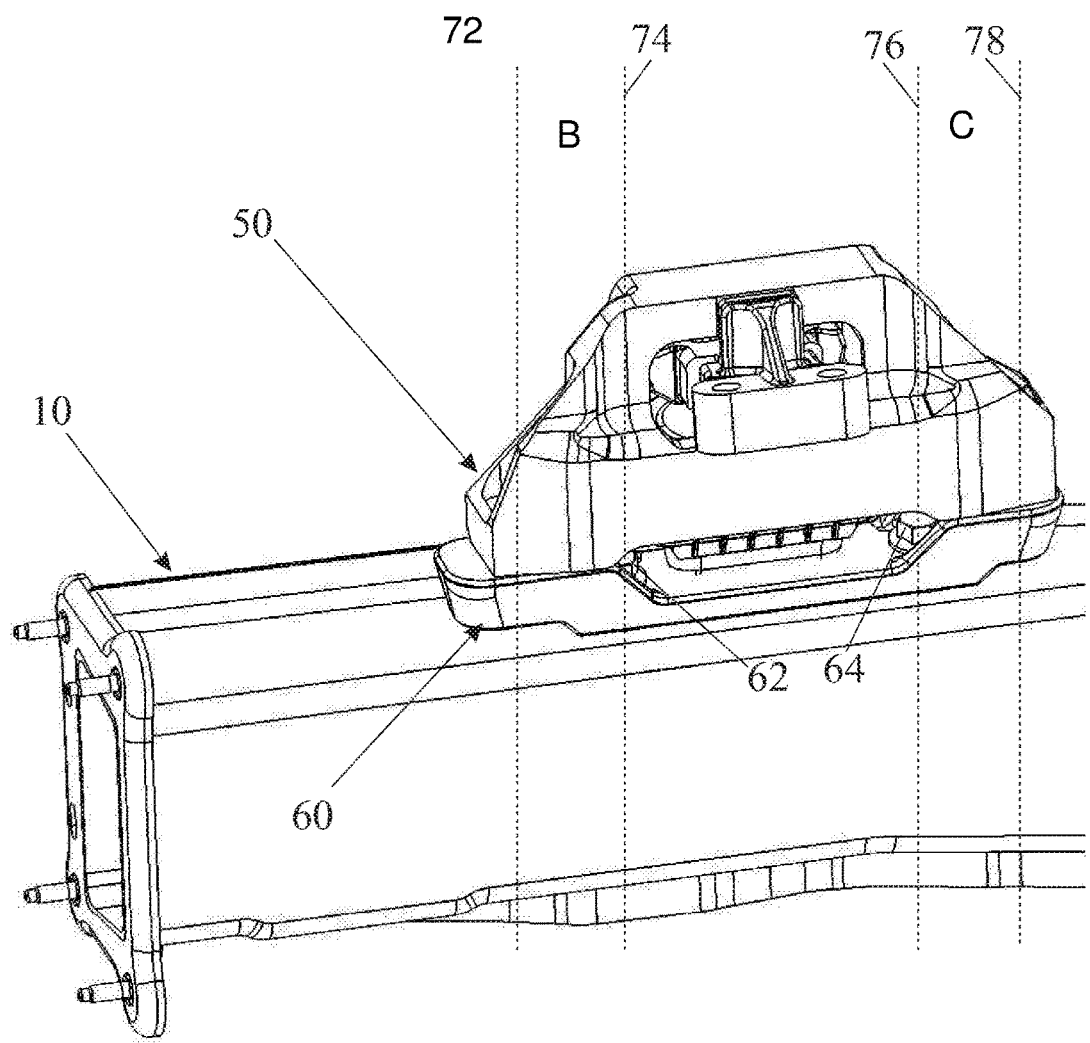
FIG. 5 is a similar view to FIG. 4 but showing an alternative embodiment of the bracket disposed between the engine mount and the frame rail.

As well as forming part of the monocoque structure of the vehicle body, the frame rail 10 is used to support the weight of at least part of the power train, which comprises the engine and the transmission. The engine cannot be directly bolted to the frame rail 10 because it needs to be allowed some degree of movement and also the vehicle body needs to be isolated from engine vibrations. The engine is therefore instead suspended from an engine mount which is shown in FIGS. 4 and 5, where it is designated 50.

The engine mount 50 is itself known and need not therefore be described in detail in the present context. For the present purposes, it suffices to understand that the engine mount has a rigid main body that is bolted to the frame rail and a member that is attached rigidly to the engine and is supported within the main body of the engine mount by means of elastic bushings. In some cases, a hydraulic liquid filled damper may be incorporated within the engine mount to absorb vertical shocks, such as when the vehicle drives over a bump. The bushings and damper used to minimize noise, vibration and harshness, usually referred to as NVH, dictate the size of the main body of the damper, which is secured to the frame rail by means of bolts located at its front and rear ends.

When the main body of the engine mount is directly bolted to the frame rail 10, the section of the frame rail lying between the securing bolts of the engine mount is stiffened by the engine mount and the accompanying reinforcement inside the frame rail and is thereby prevented from participating in the controlled deformation of the frame rail in the event of a front end collision. As a result, there is a conflict between minimizing NVH, which requires a large engine mount, and maximizing collision safety, which requires as much crushable free space on the frame rail as possible.

To help reduce this conflict, in the embodiment of FIGS. 1 to 4, a bracket 20 is disposed between the engine mount 50 and the frame rail 10. The bracket 20, which is shown separately in FIG. 3, is secured to the frame rail (for example by spot-welding) to provide an anchoring point 22 for one of the fixing bolts of the engine mount that is spaced from the frame rail 10.

The bracket 20 has a first, saddle-like, portion comprising a top plate 24 that rests above, and may be welded to, the top surface of the frame rail 10 and a side plate 26 that is secured to the inboard surface of the frame rail 10 by spot welds marked by small circles in FIG. 4. At its front end, the bracket 20 has a cantilever portion that comprises a horizontal first section 28 that is spaced from the top surface of the frame rail 10 and has welded to its underside a nut (not shown) that serves as an anchoring point and receives the fixing bolt at the front end of the engine mount. The cantilever portion further comprises an inclined section that connects the first section 28 fitted with the anchoring point 22 to the top plate 24 of the first portion of the bracket. To prevent flexing of the overhanging section 28 under the weight of the engine, a gusset 32 connects it to the inclined section 30 and the gusset is formed as an extension of, and is contiguous with, the side plate 26 of the first portion of the bracket 20. The bracket is further strengthened by turning up the outboard ends of the top plate 24, the inclined section 30 and the overhanging section 28 to form a short vertical flange.

The bracket 20 may suitably be formed of pressed steel and welded to the frame rail 10 before the latter is treated to withstand corrosion and/or painted.

The anchoring point for the fixing bolt at the rear end of the engine mount 50 is formed directly on the frame rail 10. This anchoring point may once again be a captive nut welded to the underside of the top of the frame rail. Alternatively, a weld nut may be attached to a reinforcement instead of the frame rail itself, and it could be a tube nut welded to a reinforcement.

It will be seen from FIGS. 2 and 4, that when it is secured to the frame rail 10, the rear end of the engine mount 50 is directly bolted to the frame rail using the anchoring point 40 but at its front end, it is bolted to the anchoring point 22 on the bracket 10 which is disposed above the frame rail 10. As a result, the section A of the frame rail 10 (see FIG. 4) between the two planes represented by dotted line 42 (indicating the location of anchoring point 22) and 44 (indicating the location of the forward end of the top plate 24) is capable of crumpling beneath the overhanging section 28 of the cantilever portion of the bracket 20.

It will be noted that two spot welds are shown connecting the lower portion of the gusset 32 to the frame rail forward of the plane 44. It is possible to weld the gusset 32 to the frame rail at this position because at this point the majority of the deformation takes place on the outboard side of the frame rail and the spot welds do not therefore interfere with the crumpling of the frame rail beneath the overhanging section 28 that lies between the planes 42 and 44.

The embodiment of FIGS. 1 to 4 shows a cantilever portion at only one end of the bracket 20 but it will be appreciated that a similar cantilever portion may be formed on the rear end of the bracket 20 to support the rear end of the engine mount. Such a design would increase the length of the portion of the frame rail lying to the rear of the engine mount but forward of the passenger compartment which also acts to absorb impact energy before the passenger compartment starts to deform.

A bracket 60 that has cantilever portions at both ends, as described above, is shown in FIG. 5 but differs from the bracket of the first embodiment in that it is made of an aluminum casting rather than being made of pressed steel. Furthermore, instead of being welded to the frame rail 10, the bracket 60 is secured by means of bolts 62 and 64 that engage in captive nuts in the frame rail 10. The fixing bolts of the engine mount, which are not shown in the drawing, have axes represented by dotted lines 72 and 78 whereas the axes of the bolts 62 and 64 are represented by the dotted lines 74 and 76. As may be seen, the length of the portion of the frame rail that is prevented from participating in controlled deformation is reduced by the sum of the distances B and C.

Though the invention has been described by reference to specific embodiments, it will be clear to the person skilled in the art that various modifications may be made without departing from the scope of the invention as set out in the appended claims. For example, it would be possible to form a bracket with a single cantilever portion as a solid casting and one with two cantilever portions could be formed or pressed steel.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Vehicle body structure comprising:
a frame rail having a first anchoring point for attachment of an engine mount; and
a bracket having a first portion secured to the frame rail, the first portion comprising a top plate contacting a top surface of the frame rail and a side plate contacting a lateral surface of the frame rail, at least one of the top plate and the side plate being welded to the frame rail, and a cantilever portion projecting from the first portion and comprising a first section overhanging and generally parallel with the top plate and a second section connecting the first section with the top plate and inclined relative to the top plate, the cantilever portion spaced from the frame rail and having a second anchoring point for attachment of the engine mount.

2. The vehicle body structure of claim 1, wherein the bracket further comprises a side gusset connecting the cantilever portion with the side plate.

3. The vehicle body structure of claim 1, wherein lateral edges of the top plate and the cantilever portion opposite from the side plate are turned away from the frame rail to form a flange generally parallel with the side plate.

4. The vehicle body structure of claim 1, wherein the frame rail comprises a mounting plate adapted for attachment of a vehicle front bumper.

5. The vehicle body structure of claim 1, wherein the bracket is welded to the frame rail.

6. Vehicle body structure comprising:
a frame rail having a first anchoring point;
a bracket having a first portion contacting and secured to the frame rail, and a cantilever portion projecting from the first portion, the cantilever portion spaced from the frame rail and having a second anchoring point; and
an engine mount bolted to the first and second anchoring points.

7. The vehicle body structure of claim 6, wherein the bracket first portion comprises a top plate contacting a top surface of the frame rail and a side plate contacting a lateral surface of the frame rail, at least one of the top plate and the side plate being welded to the frame rail.

8. The vehicle body structure of claim 7, wherein the cantilever portion comprises a first section overhanging and generally parallel with the top plate and a second section connecting the first section with the top plate and inclined relative to the top plate.

9. The vehicle body structure of claim 7, wherein the bracket further comprises a side gusset connecting the cantilever portion with the side plate.

10. The vehicle body structure of claim 7, wherein lateral edges of the top plate and the cantilever portion opposite from the side plate are turned away from the frame rail to form a flange generally parallel with the side plate.

11. The vehicle body structure of claim 6, wherein the frame rail comprises a mounting plate adapted for attachment of a vehicle front bumper.

12. Vehicle body structure comprising:
a frame rail; and
a bracket having a first portion contacting and secured to a surface of the frame rail, the first portion comprising a top plate contacting a top surface of the frame rail and a side plate contacting a lateral surface of the frame rail, at least one of the top plate and the side plate being welded to the frame rail, and a cantilever portion projecting from the first portion and spaced from the frame rail and comprising a first section overhanging and generally parallel with the top plate and a second section connecting the first section with the top plate and inclined relative to the top plate, the cantilever portion having an anchoring point for attachment of an engine mount.

13. The vehicle body structure of claim 12, wherein the bracket further has a second cantilever portion projecting from the first portion and spaced from the frame rail, the second cantilever portion extending in a direction opposite from that of the first cantilever portion and having a second anchoring point for attachment of the engine mount.

14. The vehicle body structure of claim 12, wherein the bracket further comprises a side gusset connecting the cantilever portion with the side plate.

15. The vehicle body structure of claim 12, wherein lateral edges of the top plate and the cantilever portion opposite from the side plate are turned away from the frame rail to form a flange generally parallel with the side plate.

16. The vehicle body structure of claim 12, wherein the frame rail comprises a mounting plate adapted for attachment of a vehicle front bumper.

\* \* \* \* \*